(No Model.)

H. M. CRIPPEN.
COMBINED END GATE AND WAGON JACK.

No. 501,330. Patented July 11, 1893.

WITNESSES:
Thos. J. Rouet, Jr.
Jas. O'Neale.

INVENTOR,
H. M. Crippen
BY
A. H. Evans & Co.
ATTORNEYS

UNITED STATES PATENT OFFICE.

HENRY M. CRIPPEN, OF ATHENS, OHIO.

COMBINED END-GATE AND WAGON-JACK.

SPECIFICATION forming part of Letters Patent No. 501,330, dated July 11, 1893.

Application filed April 14, 1893. Serial No. 470,337. (No model.)

*To all whom it may concern:*

Be it known that I, HENRY M. CRIPPEN, a citizen of the United States, residing at Athens, in the county of Athens and State of Ohio, have invented certain new and useful Improvements in End-Gates and Wagon-Jacks; and I do hereby declare that the following is a full, clear, and exact description thereof, which enables others skilled in the art to which it appertains to make and use the same, reference being had to the accompanying drawings, and to letters of reference marked thereon, which form a part of this specification.

My invention relates to combined end-gates for wagon and wagon jacks.

It has for its object to provide a device of this character which shall be simple in construction, durable to use, and readily adjusted in its position as an end-gate or in its position as a wagon jack.

With these objects in view, the invention consists in certain features of construction and combination of parts which shall be hereinafter described and claimed.

Figure 2:
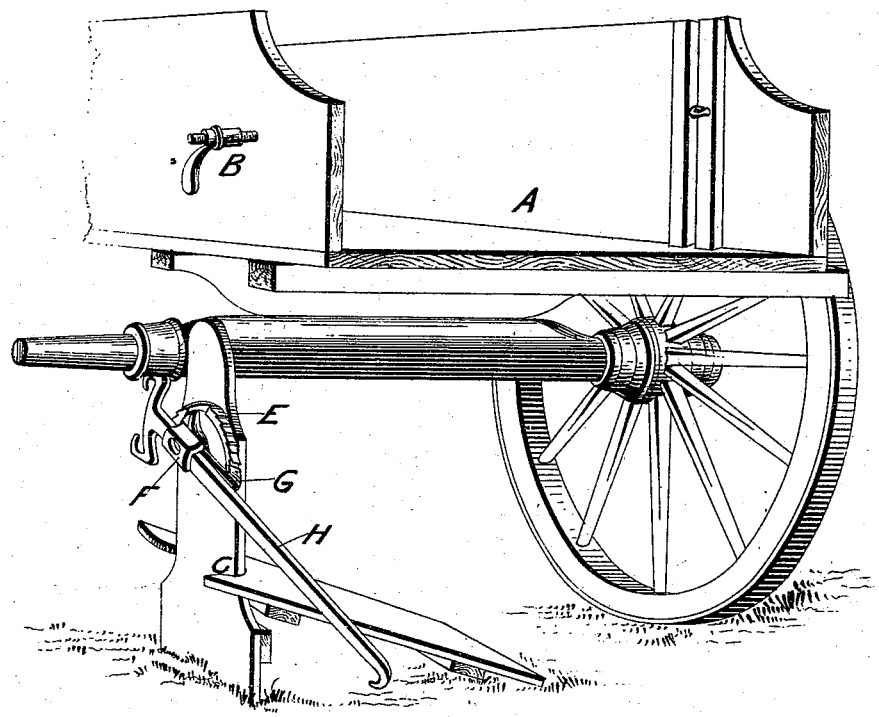
Figure 1:
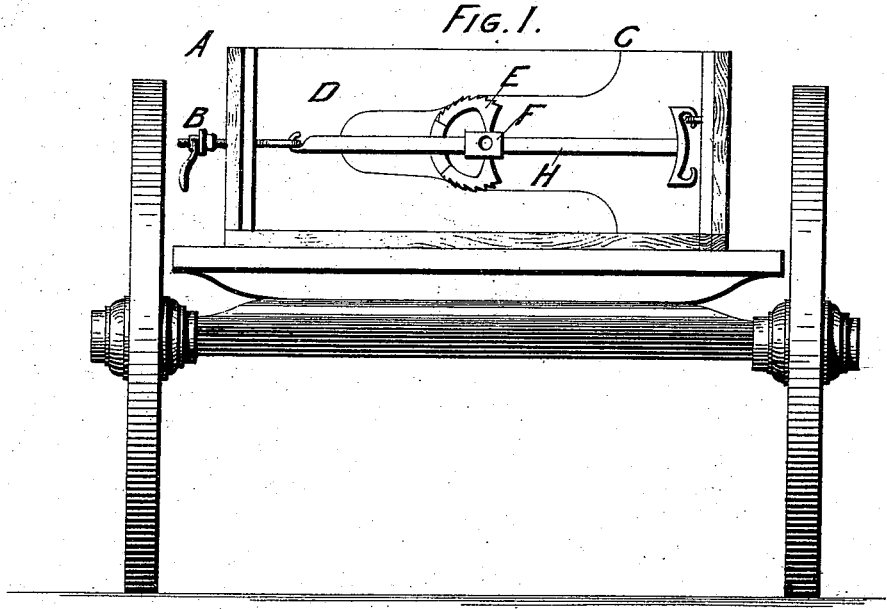

In the accompanying drawings,—Figure 1 is a view of the rear end of the wagon, illustrating my invention when used as an end gate, and Fig. 2 is a view of the devices when used as a wagon jack.

In the drawings letter A, denotes the rear end of the wagon; the rear end of the sides of which are provided with screw eyes, one of which is lengthwise adjusted by means of the handle-nut B.

D, denotes the end-gate shown in this instance rectangular in form and consisting of two parts with slats for supports fastened across the inside to shut against and being hinged at C to allow it to be folded in the position shown in Fig. 2, wherein it is shown as a wagon jack. Secured to the end gate is a toothed segment E, having a sleeve F, mounted thereon and provided with arm and pawl G, the pawl of which is adapted to engage the teeth of the segment, and mounted in this sleeve, to be adjusted lengthwise thereon is a lever H, having hooked ends which engage the eyes in the sides. When it is desired to swing this gate outward, the handle-nut is loosened, which will allow the ends of the lever engaging the eyes controlled by the handle-nut, to be disengaged and the gate may be pulled outward. Or if desired the end-gate may be removed by simply lifting it bodily upward. When it is desired to use the end-gate as a wagon jack, it is folded as shown in Fig. 2, one end of the lever being placed beneath the axle of the vehicle. The opposite end is then depressed when the axle has been raised to the desired height, it is held in its elevated position by the automatic actuated dogs engaging the teeth of the segment and by the continued pressure the same drops through and becomes disengaged as shown in Fig. 2.

From the foregoing description taken in connection with the accompanying drawings, the operation and advantage of my invention will be readily understood. It will be seen that to produce a wagon jack, I have simply sawed the end gate into two parts and have hinged them together by means of a bolt or rod through entire width of the gate so that when folded to be used as a wagon jack the supporting legs L and M are formed. This allows me to manufacture the device at a very small cost, thus enabling me to place it upon the market within the reach of all.

Having thus described my invention, I claim and desire to secure by Letters Patent of the United States—

The combined end gate and wagon jack consisting of a board sawed to form two pieces hinged together and one fitting into the other so that when folded down, two legs or supports are provided, and a lever having ends constructed to be fastened to the sides of the wagon, provided with means for engaging the axle of the wagon when employed as a jack, and means for retaining the lever in an adjusted position, substantially as set forth.

HENRY M. CRIPPEN.

Witnesses:
 E. D. SAYRES,
 ELIZABETH FOSTER.